J. T. & W. R. BARTON.
ELECTION BALLOT AND TALLY SHEET.
APPLICATION FILED NOV. 2, 1914.

1,188,342.

Patented June 20, 1916.
2 SHEETS—SHEET 1.

Fig. 1

Fig. 2

Inventors
Joseph T. Barton
William R. Barton

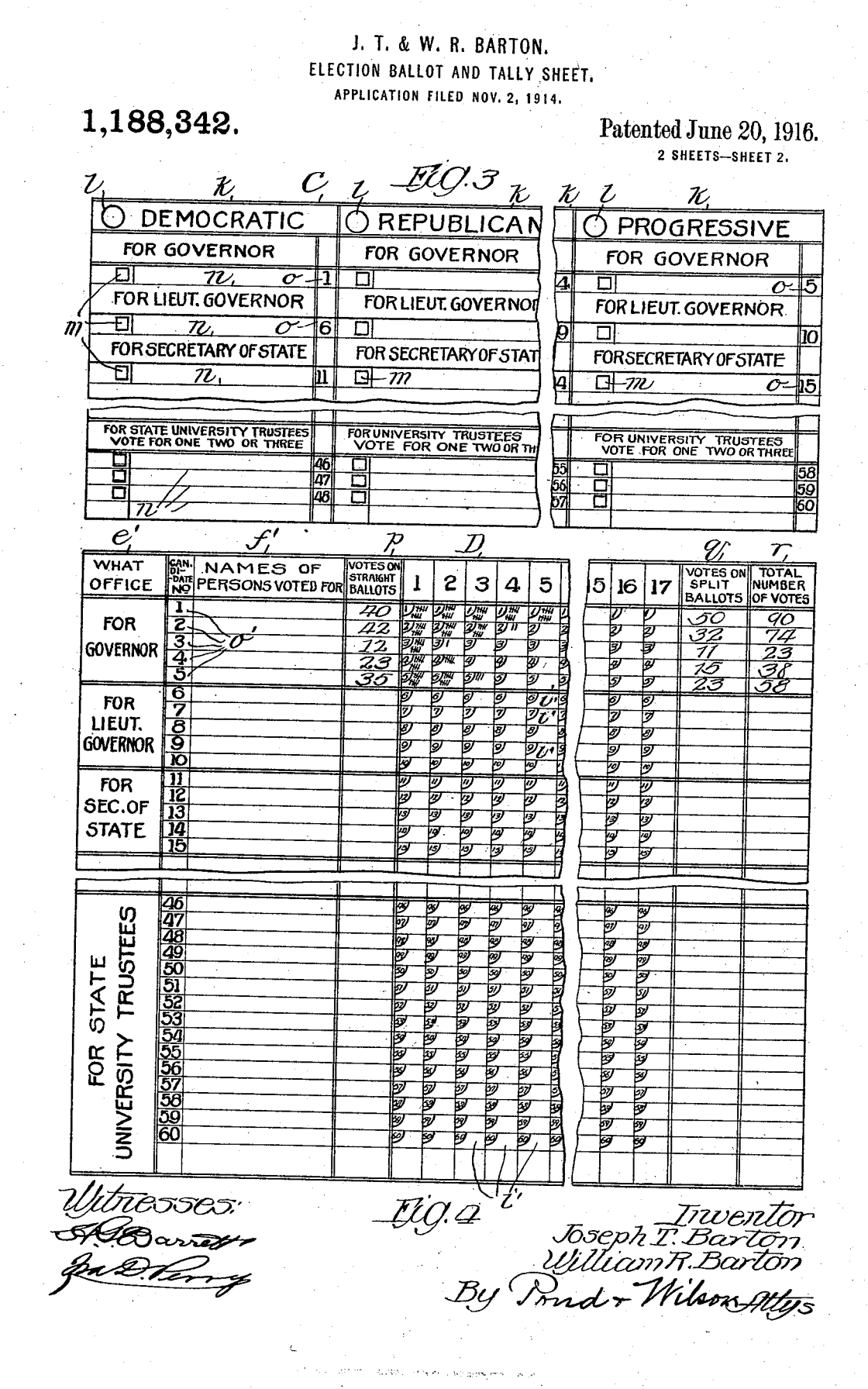

J. T. & W. R. BARTON.
ELECTION BALLOT AND TALLY SHEET.
APPLICATION FILED NOV. 2, 1914.

1,188,342.

Patented June 20, 1916.
2 SHEETS—SHEET 2.

UNITED STATES PATENT OFFICE.

JOSEPH T. BARTON AND WILLIAM R. BARTON, OF CHICAGO, ILLINOIS, ASSIGNORS OF ONE-THIRD TO MICHAEL McGARRY, OF CHICAGO, ILLINOIS.

ELECTION BALLOT AND TALLY-SHEET.

1,188,342.  Specification of Letters Patent.  Patented June 20, 1916.

Application filed November 2, 1914. Serial No. 869,786.

*To all whom it may concern:*

Be it known that we, JOSEPH T. BARTON and WILLIAM R. BARTON, both citizens of the United States, and residents of Chicago, in the county of Cook and State of Illinois, have invented certain new and useful Improvements in Election-Ballots and Tally-Sheets, of which the following is a specification.

This invention relates to an improved election ballot and tally sheet designed to secure greater expedition and accuracy in the counting and registering of election ballots. Under the ballot counting and registering system generally in vogue at the present time throughout the United States, the judges and clerks of election are provided with tally sheets on which are printed at the left hand side of the sheet in a vertical column the names of the candidates appearing on the ballot, with ruled lines extending from beneath each candidate's name crosswise of the sheet. These sheets are frequently of considerable size, and the ruled lines pertaining to each candidate's name and extending across the sheet are of considerable length. As the person or persons examining the ballots call out the names of candidates marked by the voters on said ballots, the tally clerks enter straight marks, usually in groups of five, one after another, on these lines that extend opposite the respective names of the candidates. Where such tally marks have been strung along for a considerable distance to the right of the candidates' names, there is a considerable chance of error on the part of the tally clerk in entering the tally marks on the wrong line, that is, on a line either above or below that on which the marks should be entered, and this danger of error increases the more remote the markings are made from the names. Furthermore, in cities and towns having a considerable element of foreign population, names difficult of pronunciation frequently appear on the ballot and cause some difficulty and liability of error in transmission from the reading clerk to the tally clerks. Again, ballots not infrequently contain names of candidates so similar as to cause liability of error in registration on the tally sheet. Moreover, and especially in primary elections the list of candidates for any one office is frequently a long one, and as the votes are read the tally clerks often have to skip from near the head to near the foot of such long lists of names on the tally sheet, which still further increases the liability of error in the recording of the votes on the tally sheet.

It has been with a view to eliminating the inconveniences and chances of mistakes hereinabove pointed out, and facilitating and expediting the counting and registering of the votes that the present invention has been devised. The invention is equally applicable in principle to primary, special, and regular elections, and includes as its chief distinguishing and essential characteristic, the employment in association with the candidates' names on the ballot of brief symbols, such as numerals, preferably printed immediately before or after the candidates' names, and a tally sheet wherein these same identifying symbols are printed at intervals crosswise of the sheet in the tally-marking spaces opposite the respective candidates' names. These identifying symbols may appear opposite the names of the candidates on the tally sheet alone to advantage and within the purview of the invention; but preferably they also appear upon the ballot as above described.

In the accompanying drawing we have illustrated a practical embodiment of the invention in which,—

Figure 1 is a plan view of a primary ballot, broken out between its ends; Fig. 2 is a plan view of a tally sheet, broken out lengthwise and crosswise, for the primary ballot shown in Fig. 1; Fig. 3 is a plan view of a regular election ballot, broken out lengthwise and crosswise; Fig. 4 is a plan view of a tally sheet, broken out lengthwise and crosswise, for the regular election ballot of Fig. 3.

Referring first to Figs. 1 and 2, A designates as an entirety a party primary ballot, and B designates as an entirety the tally sheet for the party primary ballot shown in Fig. 1. The primary ballot A is in the usual form of a primary ballot, containing groups of ruled lines *a* arranged in a vertical column for the names of the candidates to be voted for under each group, and the usual squares *b* at the left of each candidate's name to receive the cross mark of voters. Opposite each candidate's name, either before or after the name, is printed an identifying numeral, as shown, which is preferably set off in a small square c; these numerals being preferably used in numerical order from the top to the bottom of the column of names.

The tally sheet B is in the usual form of a primary tally sheet, containing at the left a column e designating the various offices voted for, a column f containing ruled lines a' on which appear the same lists of candidates that appear on the ballot, and at the right of the sheet columns g and h in which are recorded the totals and grand totals of the votes cast for the respective candidates.

At the right of the column f opposite and following the names of the respective candidates appear the same identifying numerals, 1, 2, 3, 4, etc., that appear opposite the names of the candidates on the ballot; these numerals also being preferably set out in squares c'; and the same numeral invariably identifying the same candidate on both the ballot and the tally sheet.

Lines a' directly beneath the candidates' names are extended crosswise of the sheet in parallel relation; and these lines are intersected by uniformly spaced vertical lines, thereby forming, opposite each candidate's name, a horizontal row of squares i in which the tally marks are entered. In each one of these tally spaces is printed the same identifying numeral that appears in the vertical columns of identifying numerals directly opposite a candidate's name; these repeated numerals being preferably set off by division lines at one end or in one corner of the rectangular space in which the tally marks are entered to avoid any possible confusion with the latter. At the head of the several vertical columns of tally spaces are numerals 1, 2, 3, 4, etc., in regular numerical order, so that by multiplying the numeral at the head of a column by the number of votes recorded in any completely filled tally space thereunder, the total number of votes up to that point is obtainable.

The regular election ballot C and tally sheet D, shown in Figs. 3 and 4, illustrate the application of the principle of our invention to a legal form of regular election ballot and tally sheet equipment. The ballot C contains, of course, parallel columns k of candidates of the various parties for the several officers to be voted for, each column being headed by the usual straight ticket circle l, and having the usual squares m in front of the names of the respective candidates which appear on the lines n. Opposite the name of each candidate on each of the several party tickets is an identifying numeral preferably set off in a square o, as shown. These numerals preferably are arranged in numerical order crosswise of the ballot, so that all the candidates for a given office on the several tickets will form a group, the identifying numerals of which will run in order and sequence. Where there are, say five candidates for a single office on the five tickets represented on the ballot, the tally sheet D will have printed thereon the names of the five candidates in successive order reading from the left to the right of the ballot, such names being printed in a vertical column f' opposite an office-designating column e', and in groups each of which contains the names of all the party candidates for a given office. Opposite the names of the candidates on the tally sheet are printed, preferably in squares o' the same identifying numerals that are used to identify the candidates on the ballot. A general election tally sheet, on which is regarded the votes received by candidates of all parties, usually contains a vertical column p for recording straight ballot votes, another column q for recording split or scratched ballot votes, and another column r for recording the totals. The ruled line space opposite the candidates' names is divided by vertical lines into rectangular tally-marking spaces i', in each of which is printed the identifying numeral of the candidate whose name appears opposite such tally space.

From the foregoing the marked advantage of our improvement in preventing error in the recording of the tally marks will be apparent. When a vote is read off for candidate No. 10, no matter how far across the tally sheet the previously recorded tally marks may have progressed, with the No. 10 staring him in the face from the proper space in which the vote should be recorded, there is extremely small chance for the tally clerk to record the vote in the wrong tally space. In other words, the repeated identifying numerals extending clear across the vote-recording space of the tally sheet form a constant guide to the tally clerk in entering the tally marks, and reduce the liability of error and mistake practically to zero.

Our invention also facilitates the work of recording the vote, since the person reading the ballots may simply read the identifying numbers of the candidates rather than the candidates' names themselves. This saves time, especially in the case of names difficult of pronunciation. It also reduces liability of error in the case of candidates having like or similar names. The invention also facilitates the work of recounting in cases of contests, as well as enabling voters to easily locate candidates on the ballot for whom they desire to vote by being furnished in advance with information as to the numerical positions on the ballot occupied by such candidates.

Obviously, other symbols than numerals might be used, and the relative arrangement shown and described may be considerably varied without involving any departure from the principle of our invention or sacrificing any of the benefits and advantages secured thereby. Hence, the invention is not to be understood as limited to the precise forms and arrangements herein shown.

We claim:

An election ballot having printed thereon the names of the candidates and, opposite each name, an identifying numeral, in combination with a tally sheet having printed thereon at one side the names of the candidates, ruled lines extending from beneath the respective candidates' names crosswise of the sheet, other lines extending at uniform intervals across and at right angles to said first mentioned lines, thereby creating horizontal and vertical rows of rectangular spaces, the identifying numeral pertaining to each candidate on the ballot being printed in each rectangular space opposite the name of said candidate.

JOSEPH T. BARTON.
WILLIAM R. BARTON.

Witnesses:
S. N. POND,
A. G. LATIMER.

Copies of this patent may be obtained for five cents each, by addressing the "Commissioner of Patents, Washington, D. C."